US012807790B2

(12) United States Patent
Magtoto et al.

(10) Patent No.: US 12,807,790 B2
(45) Date of Patent: Nov. 24, 2026

(54) COMPOSITIONS TO LIMIT, REDUCE OR ELIMINATE MALODOURS ASSOCIATED WITH PLASTIC MATERIALS

(71) Applicant: Firmenich SA, Satigny (CH)

(72) Inventors: Resti Magtoto, Plainsboro, NJ (US); Murray Osborne, Satigny (CH)

(73) Assignee: FIRMENICH SA, Satigny (CH)

( * ) Notice: Subject to any disclaimer, the term of this patent is extended or adjusted under 35 U.S.C. 154(b) by 304 days.

(21) Appl. No.: 18/562,253

(22) PCT Filed: May 27, 2022

(86) PCT No.: PCT/EP2022/064471
§ 371 (c)(1),
(2) Date: Nov. 17, 2023

(87) PCT Pub. No.: WO2022/253712
PCT Pub. Date: Dec. 8, 2022

(65) Prior Publication Data

US 2024/0239994 A1 Jul. 18, 2024

Related U.S. Application Data

(60) Provisional application No. 63/196,501, filed on Jun. 3, 2021.

(30) Foreign Application Priority Data

Jun. 28, 2021 (EP) .................................... 21181943

(51) Int. Cl.

| | |
|---|---|
| ***C08K 13/00*** | (2006.01) |
| ***C08J 7/06*** | (2006.01) |
| ***C09D 7/63*** | (2018.01) |

(52) U.S. Cl.
CPC ............... *C08K 13/00* (2013.01); *C08J 7/065* (2013.01); *C09D 7/63* (2018.01); *C08J 2400/30* (2013.01); *C08K 2201/007* (2013.01)

(58) Field of Classification Search
CPC .... C08K 13/00; C08K 2201/007; C08J 7/065; C08J 2400/30; C09D 7/63;
(Continued)

(56) References Cited

U.S. PATENT DOCUMENTS 5,350,788 A * 9/1994 Visioli .................... C08J 11/06
524/251
2011/0164834 A1 7/2011 Stiglic et al.
(Continued)

FOREIGN PATENT DOCUMENTS

CN 102435701 5/2012
JP H 033172 A * 1/1991
(Continued)

OTHER PUBLICATIONS

International Search Report and Written Opinion for corresponding International Application No. PCT/EP2022/064471 dated Aug. 22, 2022 (13 pages).

(Continued)

*Primary Examiner* — Pamela H Weiss
(74) *Attorney, Agent, or Firm* — Knobbe, Martens, Olson & Bear, LLP

(57) ABSTRACT

The present invention relates to a malodour counteracting composition as well as to a perfuming composition, a packaging material, and a consumer product comprising the malodour counteracting composition according to the invention. Further, the present invention relates to a method for limiting, reducing or eliminating the perception of malodours associated with plastic materials, comprising the step
(Continued)

of adding the malodour counteracting composition according to the invention to a plastic material.

20 Claims, 6 Drawing Sheets

(58) Field of Classification Search
CPC ........ A61L 2101/44; A61L 9/01; A61L 9/042; A61K 8/34; A61K 8/35; A61K 8/33; A61Q 13/00; C11B 9/0015
See application file for complete search history.

(56) References Cited

U.S. PATENT DOCUMENTS

| | | | | |
|---|---|---|---|---|
| 2012/0322901 | A1 * | 12/2012 | Hayward | C08J 11/06<br>521/49.8 |
| 2016/0089464 | A1 * | 3/2016 | Frankenbach | A61K 8/31<br>702/30 |
| 2022/0212862 | A1 * | 7/2022 | Yang | B65F 1/0026 |

FOREIGN PATENT DOCUMENTS

| | | | |
|---|---|---|---|
| JP | 2003-213074 | | 7/2003 |
| JP | 2016-532486 | | 10/2016 |
| JP | 2019-213782 | | 12/2019 |
| TR | 201608279 | A1 * | 10/2016 |
| WO | 2018/094314 | A1 | 5/2018 |

OTHER PUBLICATIONS

Arctander, 1969, Perfume and Flavor Chemicals, Montclair, NJ (TOC).
Furia et al., eds., Fenaroli's Handbook of Flavor Ingredients, CRC Press, Cleveland, OH (TOC).
Jacobs, 1947, Synthetic Food Adjuncts, D. Van Nostrand Company, Inc., New York (TOC).

* cited by examiner

COMPOSITIONS TO LIMIT, REDUCE OR ELIMINATE MALODOURS ASSOCIATED WITH PLASTIC MATERIALS

CROSS-REFERENCE TO RELATED APPLICATIONS

The present application is a U.S. national phase entry under 35 U.S.C. § 371 of PCT Application No. PCT/EP2022/064471, filed May 27, 2022, which claims the benefit of priority of U.S. Provisional Application No. 63/196,501, filed Jun. 3, 2021, and of European Application No. 21181943.8, filed Jun. 28, 2021. The entire contents of these applications are explicitly incorporated herein by this reference.

TECHNICAL FIELD

The present invention relates to a malodour counteracting composition as well as to a perfuming composition, a packaging material, and a consumer product comprising the malodour counteracting composition according to the invention. Further, the present invention relates to a method for limiting, reducing or eliminating the perception of malodours associated with plastic materials, comprising the step of adding the malodour counteracting composition according to the invention to a plastic material.

BACKGROUND OF THE INVENTION

Plastic materials play an important role for packaging of various types of consumer products as well as food and beverage products. However, the use of vast amounts of plastic materials for this purpose is associated with environmental problems and high disposal costs of the used plastic material.

Therefore, recycling of used plastic materials is an option that becomes increasingly popular. During the recycling of plastic materials, in particular plastic containers such as plastic bottles, the used plastic material is subjected to a vigorous washing process that includes hot caustic washing before the plastic material is made into resin pellets that again serve for the production of recycled plastic items such as recycled plastic bottles.

However, in contrast to the original plastic material also referred to as virgin plastic, recycled plastic materials often are associated with malodours that are likely to be formed during the recycling steps.

Malodours are usually complex mixtures of more than one malodourant compound which may typically include various amines, thiols, sulfides, short chain aliphatic and unsaturated acids, e.g. fatty acids, and their derivatives.

The malodours of recycled plastic material render recycled plastic material less suitable for its repeated use as packaging material for consumers products, foods and beverages, as said malodours of recycled plastic material decrease the final customer's acceptance of said recycled plastic material.

Therefore, there is a constant need for malodour counteracting technologies (MOC) for decreasing or suppressing the perception of malodours in plastic materials. However, this task is rather difficult because the chemical compounds responsible for the malodour often elicit extremely powerful smells and can have very low detection thresholds.

The present invention thus provides a malodour counteracting composition to limit, reduce or eliminate the malodours associated with plastic materials, in particular recycled plastic materials.

DETAILED DESCRIPTION OF THE INVENTION

Figure 1:
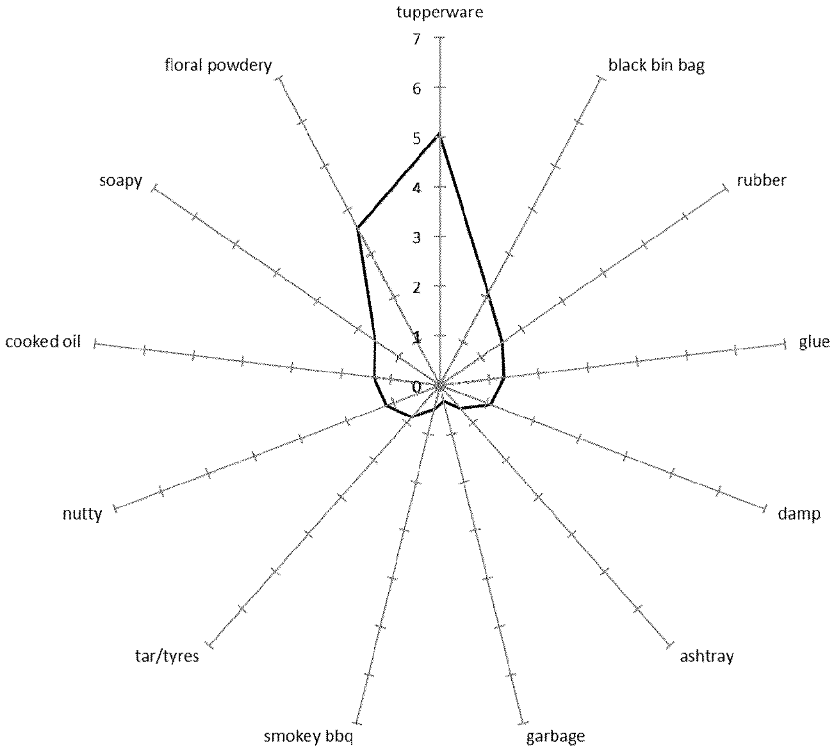
FIG. 1: QDA-sensory assessment of a virgin plastic bottle (control sample).

The present invention relates to a malodour counteracting composition comprising compounds selected from the group consisting of undecanal, dodecanal, 10-undecenal, (E/Z)-9-undecenal, (−)-(5R)-5-isopropenyl-2-methyl-2-cyclohexen-1-one, (+/−)-3,6,8,8-tetramethyloctahydro-1H-3a,7-methanoazulen-6-ol, 3,7-dimethyl-2,6-octadienal, (+/−)-3,7-dimethyl-6-octen-1-ol, (−)-(R)-3,7-dimethyl-6-octenenitrile, (+/−)-(2E)-1-(2,6,6-trimethyl-2-cyclohexen-1-yl)-2-buten-1-one, (+/−)-(3E)-3-methyl-4-(2,6,6-trimethyl-2-cyclohexen-1-yl)-3-buten-2-one, (+/−)-(1E)-1-(2,6,6-trimethyl-2-cyclohexen-1-yl)-1-penten-3-one, 5-methyl-2-(2-propanyl)cyclohexanone, isopropyl myristate, (+/−)-tetrahydro-2-isobutyl-2-methyl-4(2H)-pyranol, (+/−)-3-phenylbutanal, (3E)-4-(2,6,6-trimethyl-1/2-cyclohexen-1-yl)-3-buten-2-one, dodecahydro-3,8,8,11a-tetramethyl-5H-3,5a-epoxynaphth[2,1-c]oxepin, (+/−)-5-heptyldihydro-2(3H)-furanone, benzyl benzoate, 4-methyl-2,6-bis(2-methyl-2-propanyl)phenol, triethyl citrate, 2-ethyl-3-hydroxy-4(4H)-pyranone, (+/−)-3-(3-isoproyl-1-phenyl)butanal, 1-oxa-12/13-cyclohexydecen-2-one, (+/−)-(2,5-dimethyl-2,3-dihydro-1H-inden-2-yl)methanol, (+/−)-3-methyl-5-phenyl-1-pentanol, 3-(dodecylthio)-1-[(1RS,2SR)-2,6,6-trimethyl-3-cyclohexen-1-yl]-1-butanone, 2-(2H-1,2,3-benzotriazol-2-yl)-6-dodecyl-4-methylphenol, 2,2',2"-nitrilotriethanol, benzyl acetate, (1R,2R)-1,7,7-trimethyl-bicyclo[2.2.1]hept-2-yl acetate, (+/−)-2-(4-methyl-3-cyclohexen-1-yl)-2-propanyl acetate, acetophenone, 1-hexanol, (+/−)-2-methylundecanal, methyl 2-aminobenzoate, (1S,2S,4S)-1,7,7-trimethylbicyclo[2.2.1]heptan-2-ol, (1S,2R,4S)-1,7,7-trimethylbicyclo[2.2.1]heptan-2-ol, (+/−)-1,7,7-trimethylbicyclo[2.2.1]heptan-2-one, (+/−)-1-octen-3-ol, cedarwood oil virginia, (3aRS,5aSR,9aSR,9bRS)-3a,6,6,9a-tetramethyldodecahydronaphtho[2,1-b]furan, tricyclo[5.2.1.02,6]dec-3/4-en-8-yl acetate, 2-chromenone, (2E)-1-[(1RS,2SR)-2,6,6-trimethyl-3-cyclohexen-1-yl]-2-buten-1-one, (+/−)-2,6-dimethyl-7-octen-2-ol, (+/−)-3,7-dimethyl-1-octanol, 1,1'-oxydibenzene, dipropylene glycol, 5-methyl-3-heptanone, 3-ethoxy-4-hydroxybenzaldehyde, 3,7-dimethyl-2,6-octadien-1-ol, clove leaf oil, (Z)-3,4,5,6,6-pentamethylhept-3-en-2-one, 3,6-dimethylhexahydro-1-benzofuran-2(3H)-one, (+−)-3,7-dimethyl-1,6-octadien-3-ol, (+/−)-2,6-dimethyl-5-heptenal, 6-methyl-5-hepten-2-one, 2-octanone, 2-heptanone, 1-(5,5-dimethyl-1-cyclohexen-1-yl)-4-penten-1-one, cedarwood oil alaska, patchouli oil, (2E,6Z)-2,6-nonadienal, beta-pinene, (3Z)-3-hexen-1-ol, pyrazobutyle, 4-(2-methyl-2-propanyl)cyclohexanol, (+/−)-alpha-terpineol, 2-(2-methyl-2-propanyl)cyclohexyl acetate, acetyl cedrene, 2-methyl-3-hexanone oxime, 2-methoxynaphthalene, 1,4-epoxy-p-menthane, 1,8-epoxy-p-menthane, or any mixture thereof.

In a particular embodiment, the malodour counteracting composition consists of compounds selected from the group consisting of undecanal, dodecanal, 10-undecenal, (E/Z)-9-undecenal, (−)-(5R)-5-isopropenyl-2-methyl-2-cyclohexen-1-one, (+/−)-3,6,8,8-tetramethyloctahydro-1H-3a,7-methanoazulen-6-ol, 3,7-dimethyl-2,6-octadienal, (+/−)-3,7-dimethyl-6-octen-1-ol, (−)-(R)-3,7-dimethyl-6-octenenitrile, (+/−)-(2E)-1-(2,6,6-trimethyl-2-cyclohexen-1-yl)-2-buten-1-one, (+/−)-(3E)-3-methyl-4-(2,6,6-trimethyl-2-cyclohexen-1-yl)-3-buten-2-one, (+/−)-(1E)-1-(2,6,6-trimethyl-2-cyclohexen-1-yl)-1-penten-3-one, 5-methyl-2-(2-propanyl)cyclohexanone, isopropyl myristate, (+/−)-tetrahydro-2-isobutyl-2-methyl-4(2H)-pyranol, (+/−)-3-phenylbutanal, (3E)-4-(2,6,6-trimethyl-1/2-cyclohexen-1-yl)-3-buten-2-one, dodecahydro-3,8,8,11a-tetramethyl-5H-3,5a-epoxynaphth[2,1-c]oxepin, (+/−)-5-heptyldihydro-2(3H)-furanone, benzyl benzoate, 4-methyl-2,6-bis(2-methyl-2-propanyl)phenol, triethyl citrate, 2-ethyl-3-hydroxy-4(4H)-pyranone, (+/−)-3-(3-isoproyl-1-phenyl)butanal, 1-oxa-12/13-cyclohexydecen-2-one, (+/−)-(2,5-dimethyl-2,3-dihydro-1H-inden-2-yl)methanol, (+/−)-3-methyl-5-phenyl-1-pentanol, 3-(dodecylthio)-1-[(1RS,2SR)-2,6,6-trimethyl-3-cyclohexen-1-yl]-1-butanone, 2-(2H-1,2,3-benzotriazol-2-yl)-6-dodecyl-4-methylphenol, 2,2',2"-nitrilotriethanol, benzyl acetate, (1R,2R)-1,7,7-trimethyl-bicyclo[2.2.1]hept-2-yl acetate, (+/−)-2-(4-methyl-3-cyclohexen-1-yl)-2-propanyl acetate, acetophenone, 1-hexanol, (+/−)-2-methylundecanal, methyl 2-aminobenzoate, (1S,2S,4S)-1,7,7-trimethylbicyclo[2.2.1]heptan-2-ol, (1S,2R,4S)-1,7,7-trimethylbicyclo[2.2.1]heptan-2-ol, (+/−)-1,7,7-trimethylbicyclo[2.2.1]heptan-2-one, (+/−)-1-octen-3-ol, cedarwood oil virginia, (3aRS,5aSR,9aSR,9bRS)-3a,6,6,9a-tetramethyldodecahydronaphtho[2,1-b]furan, tricyclo[5.2.1.02,6]dec-3/4-en-8-yl acetate, 2-chromenone, (2E)-1-[(1RS,2SR)-2,6,6-trimethyl-3-cyclohexen-1-yl]-2-buten-1-one, (+/−)-2,6-dimethyl-7-octen-2-ol, (+/−)-3,7-dimethyl-1-octanol, 1,1'-oxydibenzene, dipropylene glycol, 5-methyl-3-heptanone, 3-ethoxy-4-hydroxybenzaldehyde, 3,7-dimethyl-2,6-octadien-1-ol, clove leaf oil, (Z)-3,4,5,6,6-pentamethylhept-3-en-2-one, 3,6-dimethylhexahydro-1-benzofuran-2(3H)-one, (+−)-3,7-dimethyl-1,6-octadien-3-ol, (+/−)-2,6-dimethyl-5-heptenal, 6-methyl-5-hepten-2-one, 2-octanone, 2-heptanone, 1-(5,5-dimethyl-1-cyclohexen-1-yl)-4-penten-1-one, cedarwood oil alaska, patchouli oil, (2E,6Z)-2,6-nonadienal, beta-pinene, (3Z)-3-hexen-1-ol, pyrazobutyle, 4-(2-methyl-2-propanyl)cyclohexanol, (+/−)-alpha-terpineol, 2-(2-methyl-2-propanyl)cyclohexyl acetate, acetyl cedrene, 2-methyl-3-hexanone oxime, 2-methoxynaphthalene, 1,4-epoxy-p-menthane, 1,8-epoxy-p-menthane, or any mixture thereof.

In a particular embodiment, the malodour counteracting composition comprises, preferably consists of, undecanal, dodecanal, 10-undecenal, (E/Z)-9-undecenal, (−)-(5R)-5-isopropenyl-2-methyl-2-cyclohexen-1-one, (+/−)-3,6,8,8-tetramethyloctahydro-1H-3a,7-methanoazulen-6-ol, 3,7-dimethyl-2,6-octadienal, (+/−)-3,7-dimethyl-6-octen-1-ol, (−)-(R)-3,7-dimethyl-6-octenenitrile, (+/−)-(2E)-1-(2,6,6-trimethyl-2-cyclohexen-1-yl)-2-buten-1-one, (+/−)-(3E)-3-methyl-4-(2,6,6-trimethyl-2-cyclohexen-1-yl)-3-buten-2-one, (+/−)-(1E)-1-(2,6,6-trimethyl-2-cyclohexen-1-yl)-1-penten-3-one, 5-methyl-2-(2-propanyl)cyclohexanone, isopropyl myristate, (+/−)-tetrahydro-2-isobutyl-2-methyl-4(2H)-pyranol, (+/−)-3-phenylbutanal, (3E)-4-(2,6,6-trimethyl-1/2-cyclohexen-1-yl)-3-buten-2-one, dodecahydro-3,8,8,11a-tetramethyl-5H-3,5a-epoxynaphth[2,1-c]oxepin.

In a particular embodiment, the malodour counteracting composition comprises, preferably consists of, based on the total amount of the malodour counteracting composition:

- from 5 to 10 wt. % of undecenal;
- from 1 to 2 wt. % of dodecanal;
- from 0.5 to 1 wt. % of a mixture of 10-undecenal, (E)-9-undecenal, and 10-undecenal, (Z)-9-undecenal;
- from 1 to 5 wt. % of (−)-(5R)-5-isopropenyl-2-methyl-2-cyclohexen-1-one;
- from 1 to 5 wt. % of (+/−)-3,6,8,8-tetramethyloctahydro-1H-3a,7-methanoazulen-6-ol;
- from 2 to 7 wt. % of 3,7-dimethyl-2,6-octadienal;
- from 3 to 10 wt. % of (+/−)-3,7-dimethyl-6-octen-1-ol;
- from 0.5 to 1 wt. % of (−)-(R)-3,7-dimethyl-6-octenenitrile;
- from 1 to 2 wt. % of (+/−)-(2E)-1-(2,6,6-trimethyl-2-cyclohexen-1-yl)-2-buten-1-one
- from 30 to 40 wt. % of (+/−)-tetrahydro-2-isobutyl-2-methyl-4(2H)-pyranol;
- from 20 to 30 wt. % of a mixture of (+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one;
- from 0.5 to 1 wt. % of 5-methyl-2-(2-propanyl)cyclohexanone;
- from 0.5 to 1 wt. % of (+/−)-3-phenylbutanal;
- from 2 to 6 wt. % of (3E)-4-(2,6,6-trimethyl-1/2-cyclohexen-1-yl)-3-buten-2-one;
- from 0.5 to 1 wt. % of dodecahydro-3,8,8,11a-tetramethyl-5H-3,5a-epoxynaphth[2,1-c]oxepin.

In a particular embodiment, the malodour counteracting composition comprises, preferably consists of, (+/−)-5-heptyldihydro-2(3H)-furanone, benzyl benzoate, 4-methyl-2,6-bis(2-methyl-2-propanyl)phenol, triethyl citrate, 2-ethyl-3-hydroxy-4(4H)-pyranone, (+/−)-3-(3-isoproyl-1-phenyl)butanal, 1-oxa-12/13-cyclohexydecen-2-one, (+/−)-(2,5-dimethyl-2,3-dihydro-1H-inden-2-yl)methanol, (+/−)-3-methyl-5-phenyl-1-pentanol, 3-(dodecylthio)-1-[(1RS,2SR)-2,6,6-trimethyl-3-cyclohexen-1-yl]-1-butanone, 2-(2H-1,2,3-benzotriazol-2-yl)-6-dodecyl-4-methylphenol, 2,2',2"-nitrilotriethanol, isopropyl myristate, and (3E)-4-(2,6,6-trimethyl-1/2-cyclohexen-1-yl)-3-buten-2-one.

In a particular embodiment, the malodour counteracting composition comprises, preferably consists of, based on the total amount of the malodour counteracting composition:

- from 1 to 3 wt. % of (+/−)-5-heptyldihydro-2(3H)-furanone;
- from 18 to 25 wt. % of benzyl benzoate;
- from 0.5 to 2 wt. % of 4-methyl-2,6-bis(2-methyl-2-propanyl)phenol;
- from 15 to 25 wt. % of triethylcitrate;
- from 0.01 to 0.02 wt. % of 2-ethyl-3-hydroxy-4(4H)-pyranone;
- from 0.01 to 0.2 wt. % of (+/−)-3-(3-isoproyl-1-phenyl)butanal;
- from 15 to 25 wt. % of 1-oxa-12/13-cyclohexydecen-2-one;
- from 0.1 to 1 wt. % of (+/−)-(2,5-dimethyl-2,3-dihydro-1H-inden-2-yl)methanol;
- from 15 to 20 wt. % of isopropyl myristate;
- from 1 to 5 wt. % of (+/−)-3-methyl-5-phenyl-1-pentanol;

from 5 to 10 wt. % of 3-(dodecylthio)-1-[(1RS,2SR)-2,6,6-trimethyl-3-cyclohexen-1-yl]-1-butanone;

from 0.5 to 2 wt. % of 2-(2H-1,2,3-benzotriazol-2-yl)-6-dodecyl-4-methylphenol;

from 3 to 6 wt. % of 2,2',2"-nitrilotriethanol;

from 1 to 3 wt. % of (3E)-4-(2,6,6-trimethyl-1/2-cyclohexen-1-yl)-3-buten-2-one.

In a particular embodiment, the malodour counteracting composition comprises, preferably consists of, benzyl acetate, (1R,2R)-1,7,7-trimethyl-bicyclo[2.2.1]hept-2-yl acetate, (+/−)-2-(4-methyl-3-cyclohexen-1-yl)-2-propanyl acetate, acetophenone, 1-hexanol, (+/−)-2-methylundecanal, methyl 2-aminobenzoate, (1S,2S,4S)-1,7,7-trimethylbicyclo[2.2.1]heptan-2-ol, (1S,2R,4S)-1,7,7-trimethylbicyclo[2.2.1]heptan-2-ol, (+/−)-1,7,7-trimethylbicyclo[2.2.1]heptan-2-one, (+/−)-1-octen-3-ol, cedarwood oil virginia, (3aRS,5aSR,9aSR,9bRS)-3a,6,6,9a-tetramethyldodecahydronaphtho[2,1-b]furan, tricyclo[5.2.1.02,6]dec-3/4-en-8-yl acetate, 2-chromenone, (2E)-1-[(1RS,2SR)-2,6,6-trimethyl-3-cyclohexen-1-yl]-2-buten-1-one, (+/−)-2,6-dimethyl-7-octen-2-ol, (+/−)-3,7-dimethyl-1-octanol, 1,1'-oxydibenzene, dipropylene glycol, 5-methyl-3-heptanone, 3-ethoxy-4-hydroxybenzaldehyde, 3,7-dimethyl-2,6-octadien-1-ol, clove leaf oil, (Z)-3,4,5,6,6-pentamethylhept-3-en-2-one, 3,6-dimethylhexahydro-1-benzofuran-2(3H)-one, (+−)-3,7-dimethyl-1,6-octadien-3-ol, (+/−)-2,6-dimethyl-5-heptenal, 6-methyl-5-hepten-2-one, 2-octanone, 2-heptanone, 1-(5,5-dimethyl-1-cyclohexen-1-yl)-4-penten-1-one, cedarwood oil alaska, patchouli oil, (2E,6Z)-2,6-nonadienal, beta-pinene, (3Z)-3-hexen-1-ol, pyrazobutyle, 4-(2-methyl-2-propanyl)cyclohexanol, (+/−)-alpha-terpineol, 2-(2-methyl-2-propanyl)cyclohexyl acetate, acetyl cedrene, 2-methyl-3-hexanone oxime, 2-methoxynaphthalene, 1,4-epoxy-p-menthane, 1,8-epoxy-p-menthane, 10-undecenal, undecanal, dodecanal, 10-undecenal, (9E)-9-undecenal, (9Z)-9-undecenal, (−)-(5R)-5-isopropenyl-2-methyl-2-cyclohexen-1-one, 3,7-dimethyl-2,6-octadienal, (+/−)-3,7-dimethyl-6-octen-1-ol, (−)-(R)-3,7-dimethyl-6-octenenitrile, (+/−)-(3E)-3-methyl-4-(2,6,6-trimethyl-2-cyclohexen-1-yl)-3-buten-2-one, (+/−)-(1E)-1-(2,6,6-trimethyl-2-cyclohexen-1-yl)-1-penten-3-one, 5-methyl-2-(2-propanyl)cyclohexanone, and isopropyl myristate.

Another aspect of the invention relates to a method for limiting, reducing or eliminating the perception of malodours associated with plastic materials, comprising the step of adding a malodour counteracting composition to a plastic material.

The malodour counteracting composition that is added to the plastic material can comprise any of the compounds and compound compositions, respectively, as described above.

In a particular embodiment, the plastic material is recycled plastic material. Preferably, the recycled plastic material is a plastic container intended to be used for packaging of consumer products, foods, or beverages. Such recycled plastic container may be a plastic bottle or a plastic box, preferably a plastic bottle.

In a particular embodiment, the plastic material confers at least one malodour impression selected from the group consisting of damp, nutty, cooked oil-like, rubbery, ashtray-like, tar-like, garbage-like. Such malodour impressions can be determined by e.g. sensory quantitative descriptive analysis (QDA). The aforementioned malodour impressions are often present in recycled plastic material, i.e. used plastic material that has been purified e.g. by caustic washing steps to be able to reuse said recycled plastic material e.g. as packaging material. These malodor impressions are limited, reduced or eliminated by the addition of the malodour counteracting composition according to the invention.

In a particular embodiment, the plastic material comprises malodour compounds selected from the group consisting of 1-octen-3-ol, (E)-3,7-dimethyl-1,3,6-octatrien ((E)-β-ocimen), acetophenone, cymene, 2,6-dimethyl-2,4,6-octatriene (allocimene), estragol, p-α-dimethylstyrene, or any mixture thereof.

In a particular embodiment, the plastic material comprises 1-octen-3-ol. In another particular embodiment, the plastic material comprises (E)-3,7-dimethyl-1,3,6-octatrien ((E)-β-ocimen). In another particular embodiment, the plastic material comprises acetophenone. In another particular embodiment, the plastic material comprises acetophenone cymene that may be para, meta, or ortho-cymene. In another particular embodiment, the plastic material comprises 2,6-dimethyl-2,4,6-octatriene (allocimene). In another particular embodiment, the plastic material comprises estragol. In another particular embodiment, the plastic material comprises p-α-dimethylstyrene. Specific malodour compounds can be determined e.g. by common gas-chromatography related analysis techniques such as gas-chromatography olfactometry.

In a particular embodiment, the plastic material comprises compounds selected from the group consisting of cymene, dihydromyrcenol, 3,7,7-trimethylbicyclo[4.1.0]heptan-2-one (carone), 1-octen-3-ol, and ethyl 2-methylvalerate.

In a particular embodiment, the plastic material comprises compounds selected from the group consisting of 4-methoxysalicylaldehyde, decanal, dihydromyrcenol, trans-2-octenal, 1-octen-3-ol, and prenyl acetate.

In a particular embodiment, the plastic material comprises compounds selected from the group consisting of α-isomethylionone, 2-methoxynaphtalene, α-ionone, estragol, 8-cymene-8-ol, allocimene, cymene, (E)-β-ocimene, acetophenone, and 1-octen-3-ol.

In a particular embodiment, the plastic material comprises compounds selected from the group consisting of 4-tert-butylcyclohexylacetate, estragol, allocimene, p-α-dimethylstyrene, cymene, (E)-β-ocimene, acetophenone, and 1-octen-3-ol.

In a particular embodiment, the plastic material comprises compounds selected from the group consisting of α-isomethylionone, 2-methoxynaphtalene, α-ionone, estragol, 3-(3,4-dimethylphenyl)-2,2-dimethylpropanal, allocimene, cymene, p-cresol, (E)-β-ocimene, acetophenone, and 1-octen-3-ol.

In a particular embodiment, the malodour counteracting composition is added to the plastic material in an amount sufficient to limit, reduce or eliminate the malodour perception associated with plastic material, in particular that associated with recycled plastic material.

In a particular embodiment, the malodour counteracting composition is added to the plastic material in an amount of from 0.005 to 1.0 wt %, based on the total weight of the plastic material. In another particular embodiment, the malodour counteracting composition is added in an amount of from 0.005 to 0.01 wt. %. In another particular embodiment, the malodour counteracting composition is added in an amount of from 0.01 to 0.1 wt. %. In another particular embodiment, the malodour counteracting composition is added in an amount of from 0.1 to 0.3 wt. %.

In a particular embodiment, the malodour counteracting composition is added to the plastic material by incorporating the malodour counteracting composition directly into the plastic material. This can be done e.g. by adding the malodour counteracting composition during the manufacturing process of the plastic material such that the malodour counteracting composition is incorporated into the plastic material.

In a particular embodiment, the malodour counteracting composition is added to the plastic material by providing the malodour counteracting composition in the form of a plastic coating, i.e. the plastic material is coated with the malodour counteracting composition. This can be done e.g. by spraying or brushing the malodour counteracting composition onto the plastic material. In case of a plastic container such as a plastic bottle, the interior and/or exterior of the plastic container can be coated with the malodour counteracting composition according to the invention. If required, the malodour counteracting composition according to the invention can be mixed with any additives that support the adherence of the malodour counteracting composition on the plastic material.

In a particular embodiment, the malodour counteracting composition is added to the plastic material while the malodour counteracting composition is comprised within a base formulation such as a consumer product, food or beverage. Thereby, the malodour counteracting composition is blended with the consumer product, food, or beverage, before the blend is added to the plastic material, in particular in case of the plastic material being a plastic container that may act as a packaging material for the consumer product, food or beverage comprising the malodour counteracting composition according to the invention.

In a particular embodiment, the method according to the invention eliminates the malodours associated with recycled plastic material such that the odor impression of the recycled plastic material resembles that of virgin plastic.

Another aspect of the invention relates to a perfuming composition comprising the malodour counteracting composition according to the invention.

Next to the malodour counteracting composition according to the invention, the perfuming composition still comprises at least one further perfuming raw material.

By "perfuming composition", it is meant here a particular mixture of ingredients which is intended to be added to a composition to impart, improve or modify its organoleptic properties, in particular its flavour and/or taste. Taste modulator are also encompassed in said definition.

Perfumery raw materials also termed flavouring ingredients are well known to a skilled person in the art and their nature does not warrant a more detailed description here, which in any case would not be exhaustive. A skilled flavorist is able to select them on the basis of his general knowledge and according to the intended use or application and the organoleptic effect it is desired to achieve. Many of these flavouring ingredients are listed in reference texts such as in the book by S. Arctander, Perfume and Flavor Chemicals, 1969, Montclair, N.J., USA, or its more recent versions, or in other works of similar nature such as Fenaroli's Handbook of Flavor Ingredients, 1975, CRC Press or Synthetic Food Adjuncts, 1947, by M. B. Jacobs, can Nostrand Co., Inc.

In a particular embodiment, the at least one perfuming raw material is present in the perfuming composition in an amount from 0.01 to 20% wt %, relative to the malodour counteracting composition.

In a particular embodiment, the at least one perfuming raw material is present in the perfuming composition in an amount from 0.01 to 20%, or alternatively, from 0.01 to 10, or alternatively, from 0.01 to 9, or alternatively, from 0.01 to 8, or alternatively, from 0.01 to 7, or alternatively, from 0.01 to 6, or alternatively, from 0.01 to 5, or alternatively, from 0.01 to 4, or alternatively, from 0.01 to 3, or alternatively, from 0.01 to 2, or alternatively, from 0.01 to 1, or alternatively, from 0.01 to 0.5, or alternatively, from 0.01 to 0.4, or alternatively, from 0.01 to 0.3, or alternatively, from 0.01 to 0.2, or alternatively, from 0.01 to 0.1, or alternatively, from 0.01 to 0.09, or alternatively, from 0.01 to 0.08, or alternatively, from 0.01 to 0.07, or alternatively, from 0.01 to 0.06, or alternatively, from 0.01 to 0.05, or alternatively, from 0.01 to 0.04, or alternatively, from 0.01 to 0.03, or alternatively, from 0.01 to 0.02 wt %, relative to the malodour counteracting composition.

In a particular embodiment, the perfuming composition further comprises a perfumery carrier. A perfumery carrier is understood as a material which is practically neutral from a perfumery point of view i.e. that does not significantly alter the organoleptic properties of perfuming ingredients. The carrier may be a liquid or solid. As liquid carriers one may cite, as non-limiting examples, an emulsifying system, i.e. a solvent and a surfactant system, or a solvent commonly used in perfumery. Non-limiting examples of solid perfumery carriers include absorbing gums or polymers, or yet encapsulating materials.

Another aspect of the invention relates to a packaging material comprising a plastic material and a malodour counteracting composition according to the invention.

In a particular embodiment, the packaging material consists of a plastic material and a malodour counteracting composition according to the invention.

In a particular embodiment, the plastic material is made from polyethylene (PE), in particular high density polyethylene (HDPE), or polyethylene terephthalate (PET).

In a particular embodiment, the plastic material is recycled plastic material. Preferably, the recycled plastic material is a plastic container suitable for packaging of consumer products, foods, or beverages. Such recycled plastic container may be a plastic bottle or a plastic box, preferably a plastic bottle. The packaging material comprising recycled plastic material may have the same odor impression as virgin plastic, i.e. original/non-recycled plastic material. The odor impression of virgin plastic may be described as soapy, floral powdery and Tupperware-like and can be determined e.g. by sensory quantitative descriptive analysis (QDA).

In a particular embodiment, the packaging material comprises the malodour counteracting composition in an amount of from 0.001 to 1.0 wt %, based on the total weight of the packaging composition.

In another particular embodiment, the packaging material comprises the malodour counteracting composition in an amount of from 0.005 to 0.01 wt. %.

In another particular embodiment, the packaging material comprises the malodour counteracting composition in an amount of from 0.01 to 0.1 wt. %.

In another particular embodiment, the packaging material comprises the malodour counteracting composition in an amount of from 0.1 to 0.3 wt. %.

In a particular embodiment, the malodour counteracting composition is present within the plastic material, i.e. the malodour counteracting composition is embedded within the structure of the plastic material. This can be done e.g. by adding the malodour counteracting composition during the manufacturing process of the plastic material such that the malodour counteracting composition is incorporated into the plastic material.

In a particular embodiment, the malodour counteracting composition is present on the surface of the plastic material in the form of a coating, i.e. the plastic material is coated with the malodour counteracting composition. This can be done e.g. by spraying or brushing the malodour counteracting composition onto the plastic material. In case of a plastic container such as a plastic bottle, the interior and/or exterior of the plastic container can be coated with the malodour counteracting composition according to the invention. If required, the malodour counteracting composition according to the invention can be mixed with any additives that support the adherence of the malodour counteracting composition on the surface of the plastic material.

Another aspect of the invention relates to a consumer product comprising a malodour counteracting composition according to the invention.

In a particular embodiment, the consumer product is a perfume, a fabric care product, a hair care product, a skin care product, a body deodorant or antiperspirant product, a skin-cleansing product, an air freshening product, or a surface care product.

In a particular embodiment, the consumer product is packaged in a plastic material. Preferably, the plastic material is recycled plastic material. The plastic material may be a plastic container such as a plastic bottle or a plastic box, wherein the consumer product is packaged. Preferably, the packaging material for the consumer product itself already comprises the malodour counteracting composition according to the invention. In said case, both the consumer product and the packaging material comprise the malodour counteracting composition according to the invention, wherein less malodour counteracting composition may be required in the individual consumer product and in the packaging material, respectively. This provides more flexibility as to the amounts of the malodour counteracting composition being present in the consumer product and in the packaging material, respectively.

Another aspect of the invention relates to the use of a malodour counteracting composition according to the invention for reducing or eliminating the perception of malodours associated with plastic materials.

Another aspect of the invention relates to the use of a perfuming composition according to the invention for reducing or eliminating the perception of malodours associated with plastic materials.

Another aspect of the invention relates to the use of a malodour counteracting composition according to the invention for preparing a packaging material.

Another aspect of the invention relates to the use of a malodour counteracting composition according to the invention for preparing a consumer product.

EXAMPLES

Example 1: Characterization of Malodours Associated with Recycled Plastic Bottles Malodours present in four recycled plastic bottles were identified and characterized using a behavioral sensory evaluation approach known as the Quantitative Descriptive Analysis (QDA), developed by Tragon Corporation in 1974. A virgin plastic bottle, i.e. non-recycled plastic bottle was used a control sample. QDA uses descriptive panels to measure a product's sensory characteristics. Panel members use their senses to identify perceived similarities and differences in products, and articulate those perceptions in their own words.

The plastic bottles were covered with an odourless black tape to avoid any bias. For sensorial assessment, the panelists were instructed to flip open the lid and squeeze the bottle a few times to smell it.

During language development sessions, panelists received the products to describe them. All terms generated were then evaluated on a 6-point nonlinear scale from 0 (not perceived odour) to 5 (strong odour).

In total 13 sensory terms were identified as significant to describe the odour of the 5 plastic bottles. The sensory list of attributes was as follows:

| Final attributes | Attributes definition |
|---|---|
| black bin bag | smell of a black bin bag used to trash household things |
| Tupperware | smell of the type of plastic container that closes very tightly and is used to store food |
| rubber | smell of fresh rubber, like rubber soles of a brand-new pair of shoes |
| cooked oil | smell of used, cooked oil |
| floral powdery | smell of Violet, Muguet floral, powdery notes |
| smoked bbq | smell of a bbq |
| nutty | smell of nut fruits, like hazelnuts, peanuts |
| ashtray | smell of an ashtray, cigarettes ashes and butts |
| damp | smell of something earthy, wet and humid |
| glue | smell of white glue |
| tar/tyres | smell of tarmac |
| soapy | aldehydic smell |
| garbage | smell of a bin lorry on the street |

Each product was then evaluated three times against the control sample (virgin plastic) using a 10 cm semi-structed intensity scale to provide a sufficient dataset for statistical analysis.

In FIG. 1, the sensory assessment of virgin plastic (control sample) is shown, which presented a neutral smell. It was mainly characterized by the smells of Tupperware and floral powdery.

Figure 2:
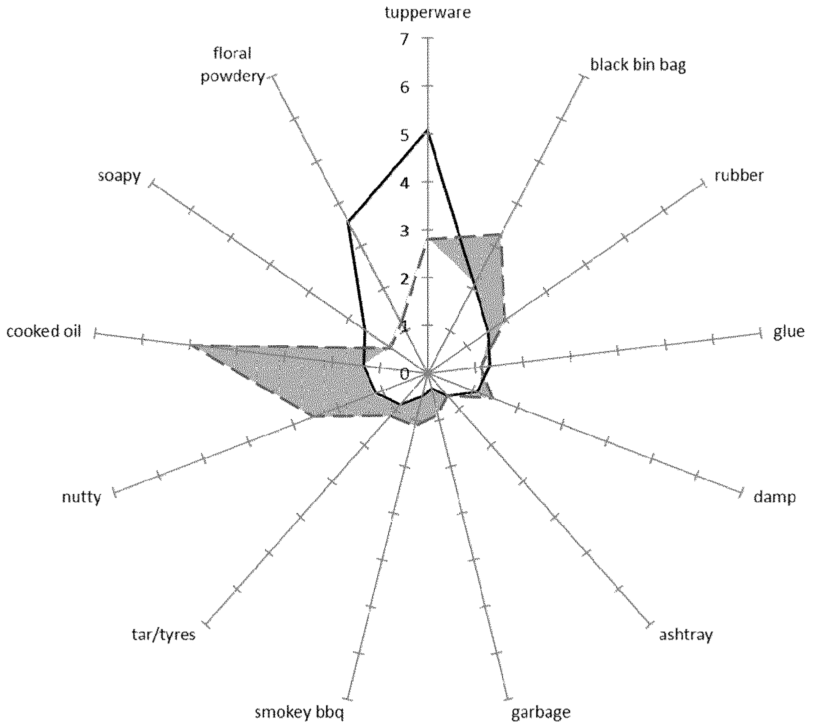
FIG. 2: QDA-sensory assessment of the first recycled plastic bottle.

In FIG. 2, the sensory assessment of the first recycled plastic bottle is shown, which presented a significantly ($p \leq 0.05$) stronger odor impression as to the smells of black bin bag, cooked oil and nutty notes, and tended (($p \leq 0.1$) to be stronger in smokey bbq and garbage odours, compared to the control sample.

Figure 3:
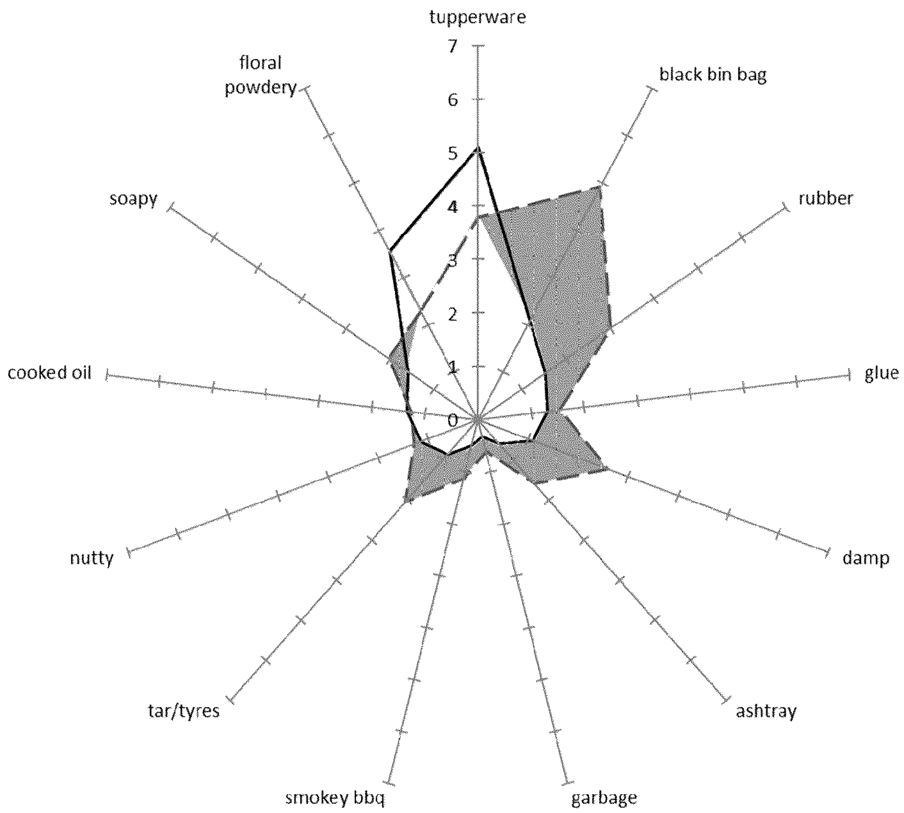
FIG. 3: QDA-sensory assessment of the second recycled plastic bottle.

In FIG. 3, the sensory assessment of the second recycled plastic bottle is shown, which presented a significantly ($p \leq 0.05$) stronger odor impression as to the smells of tar/tyres, smokey bbq, ashtray, damp, rubber and black bin bag notes, compared to the control sample.

Figure 4:
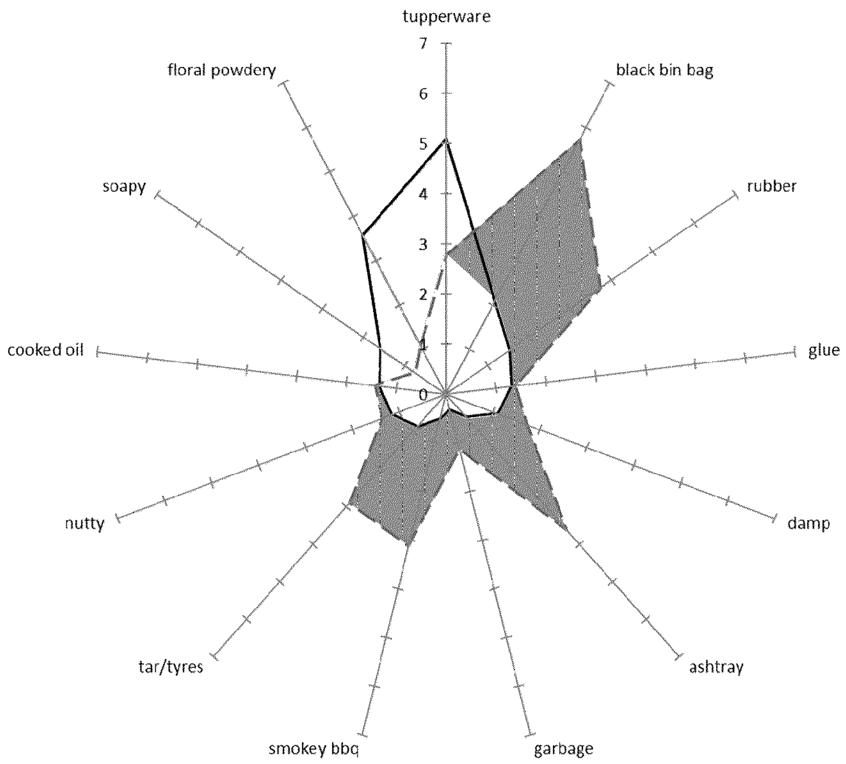
FIG. 4: QDA-sensory assessment of the third recycled plastic bottle.

In FIG. 4, the sensory assessment of the third recycled plastic bottle is shown, which presented a significantly ($p \leq 0.05$) stronger odor impression as to the smells of tar/tyres, smokey bbq, ashtray, garbage, rubber, and black bin bag, compared to the control sample.

Figure 5:
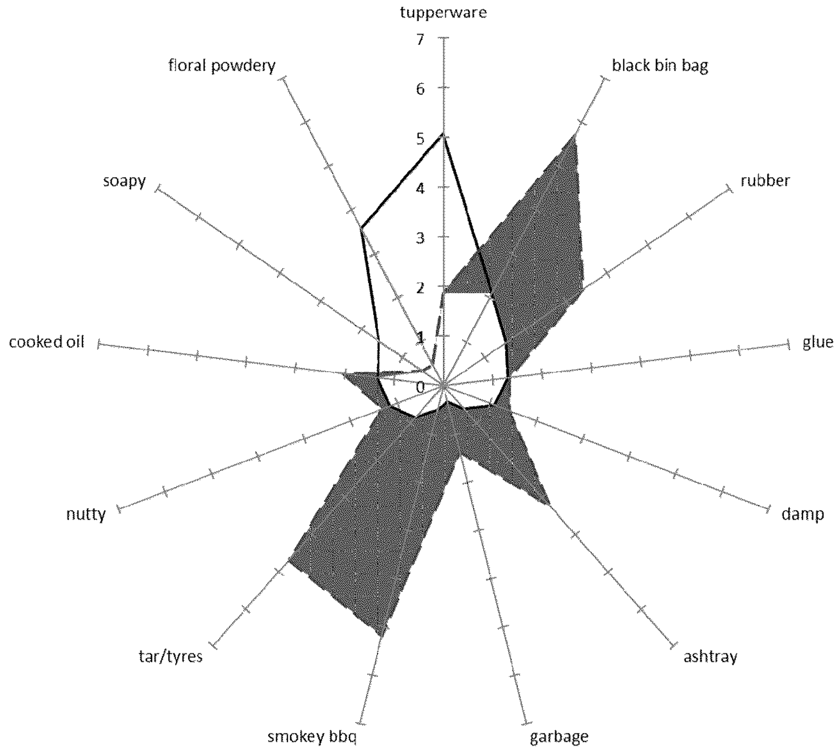
FIG. 5: QDA-sensory assessment of the fourth recycled plastic bottle.

In FIG. 5, the sensory assessment of the fourth recycled plastic bottle is shown, which presented a significantly ($p \leq 0.05$) stronger odor impression as to the smells of tar/tyres, smokey bbq, garbage, cooked oil, ashtray, rubber, and black bin bag notes, compared to the control sample.

Example 2: Elucidation of Compounds Potentially Contributing to the Malodour in Recycled Plastic Bottles Gas-chromatography olfactometry/mass spectrometry was used to investigate malodour compounds in the four recycled plastic bottles as already mentioned in Example 1.

The compounds were first adsorbed on a SPME fiber and desorbed into a gas chromatography column. Thereby, the eluted compounds were split in that part of the eluted compounds moved towards a mass spectrometry detector, while the other part moved to a sniffing port, allowing the panelist to smell the compounds that exited the column. Once the panelist smelled an odorous compound, they described the odour character and intensity. As both detectors were used simultaneously, the compounds could be smelled at the exact time as they entered the mass spectrometer, allowing individual compounds to be identified in complex mixtures.

In the control sample (virgin plastic) the following compounds were identified:

| compound | odor description |
|---|---|
| cymene | plastic |
| dihydromyrcenol | green |
| carone | phenolic |
| 1-octen-3-ol | mushroom plastic |
| ethyl 2-methylvalerate | fruity ester |

In the first recycled plastic bottle the following compounds were identified:

| compound | odor description |
|---|---|
| 4-methoxysalicylaldehyde | smoky phenolic sweet |
| decanal | mandarin green fatty aldehydic |
| dihydromyrcenol | metallic green earthy |
| trans-2-octenal | aldehydic fatty |
| 1-octen-3-ol | mushroom |
| prenyl acetate | sweaty |

In the second recycled plastic bottle the following compounds were identified:

| compound | odor description |
|---|---|
| alpha-iso-methylionone | sweet powdery fruity |
| 2-methoxynaphtalene | sweet naphtyl floral |
| alpha-ionone | floral violet powdery |
| estragol | plastic medicated |
| 3-(3,4-dimethylphenyl)-2,2-dimethylpropanal | plastic |
| allocimene | phenolic spicy |
| cymene isomer | plastic |
| p-cresol | phenolic medicated |
| m-cymene | phenolic medicated |
| (E)-beta-ocimene/acetophenone | dirty green |
| 1-octen-3-ol | mushroom |

In the third recycled plastic bottle the following compounds were identified:

| compound | odor description |
|---|---|
| alpha-iso-methylionone | sweet powdery fruity |
| 2-methoxynaphtalene | sweet naphtyl floral |
| alpha-ionone | floral violet powdery |
| estragol | plastic medicated |
| 8-cymene-8-ol | green pyrazine |
| allocimene | phenolic spicy |
| cymene isomer | plastic |
| cymene isomer | sweet phenolic |
| (E)-beta-ocimene/acetophenone | earthy coffee |
| 1-octen-3-ol | mushroom |

In the fourth recycled plastic bottle the following compounds were identified:

| compound | odor description |
|---|---|
| 4-tert-butylcyclohexylacetate | earthy |
| estragol | plastic medicated phenol |
| allocimene | metallic medicinal phenolic |
| p-alpha-dimethylstyrene | green plastic |
| cymene isomer | plastic |
| p-alpha-dimethylstyrene isomer | tar |
| m-cymene | coffee earthy |
| (E)-beta-ocimene/acetophenone | green earthy |

Example 3: Malodour Reduction of Recycled Plastic Bottles

The fourth recycled plastic bottle as referred to in Example 1 and Example 2, respectively, which showed the highest intensity of malodours among the assessed recycled plastic bottles, has been treated with a malodour counteracting composition in that the interior of the recycled plastic bottle has been uniformly coated with a malodour counteracting composition.

The malodour counteracting composition that was used had the following formulation:

7.02 wt. % of undecenal;

1.75 wt. % of dodecanal;

0.88 wt. % of a mixture of 10-undecenal, (E)-9-undecenal, and 10-undecenal, (Z)-9-undecenal;

3.51 wt. % of (−)-(5R)-5-isopropenyl-2-methyl-2-cyclohexen-1-one;

3.51 wt. % of (+/−)-3,6,8,8-tetramethyloctahydro-1H-3a,7-methanoazulen-6-ol;

5.26 wt. % of 3,7-dimethyl-2,6-octadienal;

7.02 wt. % of (+/−)-3,7-dimethyl-6-octen-1-ol;

0.88 wt. % of (−)-(R)-3,7-dimethyl-6-octenenitrile;

1.75 wt. % of (+/−)-(2E)-1-(2,6,6-trimethyl-2-cyclohexen-1-yl)-2-buten-1-one;

35.09 wt. % of (+/−)-tetrahydro-2-isobutyl-2-methyl-4(2H)-pyranol;

26.32 wt. % of a mixture of (+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one;

0.88 wt. % of 5-methyl-2-(2-propanyl)cyclohexanone;

0.88 wt. % of (+/−)-3-phenylbutanal;

4.39 wt. % of (3E)-4-(2,6,6-trimethyl-1/2-cyclohexen-1-yl)-3-buten-2-one;

0.88 wt. % of dodecahydro-3,8,8,11a-tetramethyl-5H-3,5a-epoxynaphth[2,1-c]oxepin.

An expert panel then assessed the malodour intensity after treatment (coating) of the recycled plastic bottle with the aforementioned malodour counteracting composition. As can be observed from FIG. 6 (comparison between the first column (before treatment) and the second (mid)-column), the malodour intensity decreased after treatment with the malodour counteracting composition from 6 to 4. Thereby, a significant decrease of the malodour perception of the recycled plastic bottle could be achieved by the treatment with the above-mentioned malodour counteracting composition (referred to as the “first treatment” in FIG. 6).

In a further experiment (second treatment), the fourth recycled plastic bottle has been treated with another malodour counteracting composition in that the interior of the recycled plastic bottle has been uniformly coated with the malodour counteracting composition.

The used malodour counteracting composition had the following formulation:

2 wt. % of (+/−)-5-heptyldihydro-2(3H)-furanone;
22 wt. % of benzyl benzoate;
1 wt. % of 4-methyl-2,6-bis(2-methyl-2-propanyl)phenol;
20 wt. % of triethylcitrate;
0.01 wt. % of 2-ethyl-3-hydroxy-4(4H)-pyranone;
0.1 wt. % of (+/−)-3-(3-isoproyl-1-phenyl)butanal;
20 wt. % of 1-oxa-12/13-cyclohexydecen-2-one;
0.5 wt. % of (+/−)-(2,5-dimethyl-2,3-dihydro-1H-inden-2-yl)methanol;
16.39 wt. % of isopropyl myristate;
2 wt. % of (+/−)-3-methyl-5-phenyl-1-pentanol;
8 wt. % of 3-(dodecylthio)-1-[(1RS,2SR)-2,6,6-trimethyl-3-cyclohexen-1-yl]-1-butanone;
1 wt. % of 2-(2H-1,2,3-benzotriazol-2-yl)-6-dodecyl-4-methylphenol;
5 wt. % of 2,2',2"-nitrilotriethanol;
2 wt. % of (3E)-4-(2,6,6-trimethyl-1/2-cyclohexen-1-yl)-3-buten-2-one.

Figure 6:
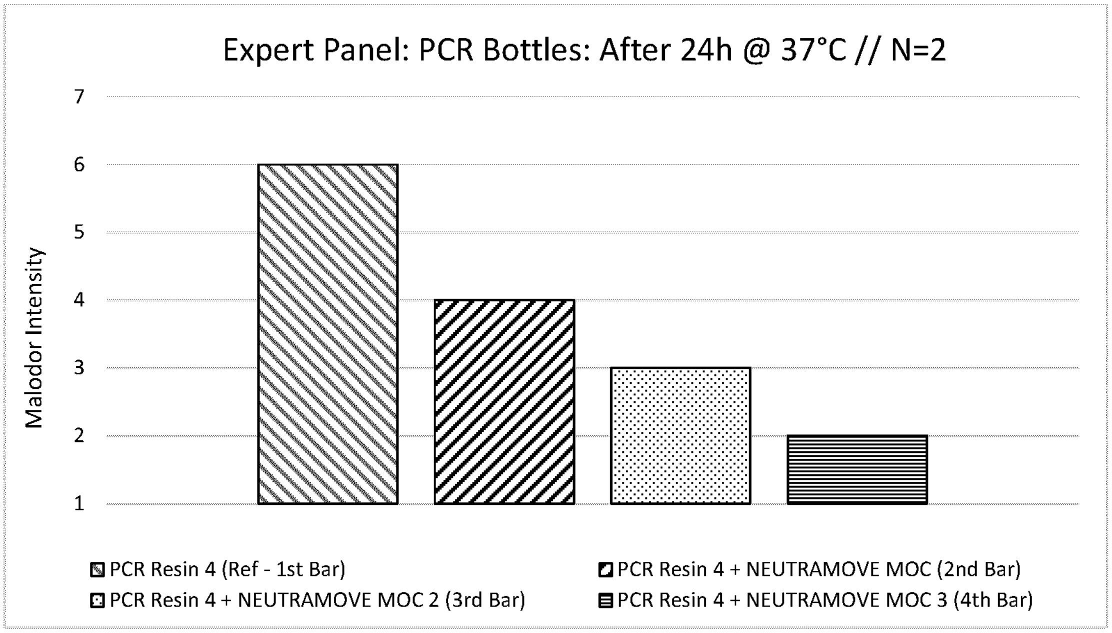
FIG. 6: Malodour intensity of an untreated recycled plastic bottle and of recycled plastic bottles treated with malodour counteracting compositions.

As can be observed from FIG. 6 (comparison between the first column (before treatment) and the second, third and fourth (right-columns), the malodour intensity decreased after treatment with different malodour counteracting compositions from 6 down to 2 with the best MOC performance with the Neutramove MOC 3 accord. Thereby, a significant decrease of the malodour perception of the recycled plastic bottle could be achieved by the treatment with the abovementioned malodour counteracting composition.

The invention claimed is:

1. A malodour counteracting composition comprising, based on the total amount of the malodour counteracting composition:

from 5 to 10 wt. % of undecenal;
from 1 to 2 wt. % of dodecanal;
from 0.5 to 1 wt. % of a mixture of 10-undecenal, (E)-9-undecenal, and 10-undecenal, (Z)-9-undecenal;
from 1 to 5 wt. % of (−)-(5R)-5-isopropenyl-2-methyl-2-cyclohexen-1-one;
from 1 to 5 wt. % of (+/−)-3,6,8,8-tetramethyloctahydro-1H-3a,7-methanoazulen-6-ol;
from 2 to 7 wt. % of 3,7-dimethyl-2,6-octadienal;
from 3 to 10 wt. % of (+/−)-3,7-dimethyl-6-octen-1-ol;
from 0.5 to 1 wt. % of (−)-(R)-3,7-dimethyl-6-octenenitrile;
from 1 to 2 wt. % of (+/−)-(2E)-1-(2,6,6-trimethyl-2-cyclohexen-1-yl)-2-buten-1-one
from 30 to 40 wt. % of (+/−)-tetrahydro-2-isobutyl-2-methyl-4 (2H)-pyranol;
from 20 to 30 wt. % of a mixture of (+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one;
from 0.5 to 1 wt. % of 5-methyl-2-(2-propanyl)cyclohexanone;
from 0.5 to 1 wt. % of (+/−)-3-phenylbutanal;
from 2 to 6 wt. % of (3E)-4-(2,6,6-trimethyl-1/2-cyclohexen-1-yl)-3-buten-2-one; and
from 0.5 to 1 wt. % of dodecahydro-3,8,8,11a-tetramethyl-5H-3,5a-epoxynaphth [2,1c]oxepin.

2. A malodour counteracting composition comprising, based on the total amount of the malodour counteracting composition:

from 1 to 3 wt. % of (+/−)-5-heptyldihydro-2 (3H)-furanone;
from 18 to 25 wt. % of benzyl benzoate;
from 0.5 to 2 wt. % of 4-methyl-2,6-bis(2-methyl-2-propanyl) phenol;
from 15 to 25 wt. % of triethylcitrate;
from 0.01 to 0.02 wt. % of 2-ethyl-3-hydroxy-4 (4H)-pyranone;
from 0.01 to 0.2 wt. % of (+/−)-3-(3-isoproyl-1-phenyl) butanal;
from 15 to 25 wt. % of 1-oxa-12/13-cyclohexydecen-2-one;
from 0.1 to 1 wt. % of (+/−)-(2,5-dimethyl-2,3-dihydro-1H-inden-2-yl) methanol;
from 15 to 20 wt. % of isopropyl myristate;
from 1 to 5 wt. % of (+/−)-3-methyl-5-phenyl-1-pentanol;
from 5 to 10 wt. % of 3-(dodecylthio)-1-[(1RS,2SR)-2,6,6-trimethyl-3-cyclohexen-1-yl]-1-butanone;
from 0.5 to 2 wt. % of 2-(2H-1,2,3-benzotriazol-2-yl)-6-dodecyl-4-methylphenol;
from 3 to 6 wt. % of 2,2',2"-nitrilotriethanol; and
from 1 to 3 wt. % of (3E)-4-(2,6,6-trimethyl-1/2-cyclohexen-1-yl)-3-buten-2-one.

3. A perfuming composition comprising the malodour counteracting composition of claim 1.

4. A packaging material comprising a plastic material and the malodour counteracting composition of claim 1.

5. The packaging material of claim 4, wherein the plastic material is recycled plastic material.

6. The packaging material of claim 4, wherein the malodour counteracting composition is present on the surface of the plastic material in the form of a coating.

7. The packaging material of claim 4, wherein the malodour counteracting composition is present in an amount of from 0.001 to 1.0 wt %, based on the total weight of the packaging composition.

8. A consumer product comprising the malodour counteracting composition of claim 1.

9. A method for limiting, reducing or eliminating the perception of malodours associated with plastic materials, comprising the step of adding a malodour counteracting composition of claim 1 to a plastic material.

10. The method of claim 9, wherein the malodour counteracting composition is added to the plastic material in an amount of from 0.005 to 1 wt %, based on the total weight of the plastic material.

11. The method of claim 9, wherein the malodour counteracting composition is added to the plastic material by incorporating the malodour counteracting composition into the plastic material and/or by providing the malodour counteracting composition in the form of a plastic coating.

12. A perfuming composition comprising the malodour counteracting composition of claim 2.

13. A packaging material comprising a plastic material, and the malodour counteracting composition of claim 2.

14. The packaging material of claim 10, wherein the plastic material is recycled plastic material.

15. The packaging material of claim 10, wherein the malodour counteracting composition is present on the surface of the plastic material in the form of a coating.

16. The packaging material of claim 10, wherein the malodour counteracting composition is present in an amount of from 0.001 to 1.0 wt %, based on the total weight of the packaging composition.

17. A consumer product comprising the malodour counteracting composition of claim 2.

18. A method for limiting, reducing or eliminating the perception of malodours associated with plastic materials, comprising the step of adding a malodour counteracting composition of claim 2 to a plastic material.

19. The method of claim 18, wherein the malodour counteracting composition is added to the plastic material in an amount of from 0.005 to 1 wt %, based on the total weight of the plastic material.

20. The method of claim 18, wherein the malodour counteracting composition is added to the plastic material by incorporating the malodour counteracting composition into the plastic material and/or by providing the malodour counteracting composition in the form of a plastic coating.

* * * * *